United States Patent Office 2,970,897
Patented Feb. 7, 1961

2,970,897

GASOLINE CONTAINING ANTIOXIDANTS

Clyde S. Scanley and Ken Matsuda, Stamford, Conn., and Ralph A. Coleman, Middlesex, N.J., assignors to American Cyanamid Company, New York, N.Y., a corporation of Maine No Drawing. Filed Dec. 3, 1957, Ser. No. 700,301

3 Claims. (Cl. 44—63)

This invention relates to hydrocarbon fuels stabilized against oxidative deterioration by a novel class of antioxidants.

It is well known that volatile hydrocarbon fuels of the type of cracked gasoline tend to deteriorate upon storage, and that this deterioration is due to polymerization and gum formation initiated by the presence of oxygen. It is a principal object of our present invention to provide a novel class of antioxidants which, when incorporated into the gasoline in small but effective amounts, will delay or inhibit such oxidative deterioration, thus increasing the storage stability of the fuel. The oxidation inhibitors of this class present the important advantage over other known inhibitors that they can be prepared from relatively cheap and easily obtainable raw materials and are therefore available at a relatively low cost.

Our invention is based on the discovery that the condensation products of cyanogen with primary aliphatic diamines are effective gasoline antioxidants.

When cyanogen is condensed with an alkylenediamine ammonia is evolved and bicyclic compounds are obtained having the formula:

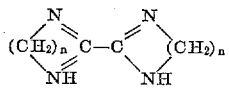

in which $n$ represents the number of carbon atoms in the alkylenediamine used. We have found that these cyclic compounds are effective gasoline antioxidants. Compounds of the same general class can also be prepared by condensing cyanogen with polyalkylenepolyamines such as ethylenediamine, diethylenetriamine, 3,3'-iminobispropylamine, 1,2-propanediamine, 1,3-propanediamine, triethylenetetramine, 1,4-butanediamine and the like.

The compounds of the above types are light colored solids that are soluble in gasoline and other cracked hydrocarbon distillates in the amounts required to impart effective antioxidant action. The exact amounts to be used will of course vary with the type of gasoline or other hydrocarbon distillate and with the degree of protection desired; in most cases quantities within the range of about 0.001% to 0.1% are sufficient. These quantities are hereinafter designated as antioxidizing amounts. Our novel antioxidants may be used alone, or in admixture with each other.

The invention will be further described and illustrated by the following examples.

*Example 1*

2,2'-bi-2-imidazoline of the formula

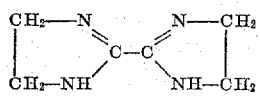

is prepared from ethylenediamine and cyanogen by the method of Woodburn and O'Gee, J. Org. Chem. 17, 1235–44 (1952).

*Example 2*

2,2-bi-3,4,5,6-tetrahydropyrimidine of the formula

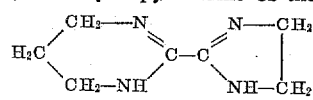

is prepared by the cyanogenation of 1,3-propanediamine as described by Woodburn and Fisher, J. Org. Chem. 22, 898 (1957).

*Example 3*

2,2'-bis-(4,5,6,7-tetrahydro-1,3-diazepine) of the formula

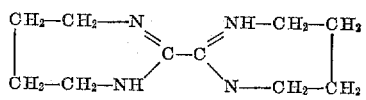

is prepared by introducing 26 parts of cyanogen into a solution of 88 parts of 1,4-butanediamine in 236 parts by weight of absolute ethanol at 7° C. dudring 20 minutes, stirring for one hour at 3° C. and then heating under reflux (81.5° C.) for about 100 hours while introducing a stream of nitrogen gas to facilitate ammonia removal. The alcohol is then distilled off, water is added and the aqueous solution is extracted six times with ether. The extract is dried and decolorized with active charcoal and the ether evaporated leaving the desired product, a cream-colored solid melting at 83°–90° C. This method is described in further detail by Ken Matsuda in U. S. application Serial No. 652,672 filed April 15, 1957, now U.S. Patent No. 2,819,262.

*Example 4*

The compounds of the preceding examples were tested as antioxidants in cracked gasoline by the A.S.T.M.–D–525–49 oxygen bomb test in which a 50 ml. sample of gasoline containing the antioxidant is maintained under 100 p.s.i. oxygen pressure at about 90°–100° C. until the break point is reached, and the induction period is measured. The results are shown in the following table in which the induction time ratio is calculated by the formula:

$$\frac{\text{Induction period for gasoline} + \text{additive}}{\text{Induction period for gasoline alone}} = \text{I.T.R.}$$

| Example | Compound | Conc., percent | I.T.R. |
|---|---|---|---|
| 1 | 2,2'-bi-2-imidazoline | 0.01 | 1.60 |
| 2 | 2,2'-bi-3,4,5,6-tetrahydropyrimidine | 0.004 | 1.54 |
| 3 | 2,2'-bis-(4,5,6,7-tetrahydro-1,3-diazepine) | 0.004 | 1.34 |
| Control | 2,2'-methylenebis-(4-methyl-6-t-butylphenol) | 0.01 | 1.54 |

What we claim is:

1. Gasoline subject to oxidative deterioration and containing, in an antioxidizing amount, a compound of the formula

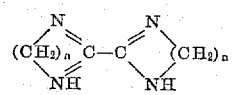

in which $n$ is a whole number from 2 to 4 inclusive.

2. Gasoline subject to oxidative deterioration and containing, in an antioxidizing amount, a compound of the formula

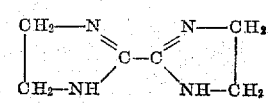

3. Gasoline subject to oxidative deterioration and containing, in an antioxidizing amount, a compound of the formula
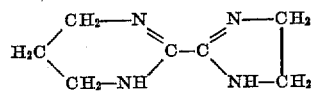
References Cited in the file of this patent
UNITED STATES PATENTS
| | | | |
|---|---|---|---|
| 2,396,156 | Clarkson | Mar. | 5, 1946 |
| 2,551,786 | Biswell | May | 8, 1951 |
| 2,553,183 | Caron et al | May | 15, 1951 |
| 2,747,980 | Gleim | May | 29, 1956 |
| 2,754,183 | Chenicek | July | 10, 1956 |
| 2,844,446 | Cyba et al | July | 22, 1958 |

UNITED STATES PATENT OFFICE
CERTIFICATION OF CORRECTION

Patent No. 2,970,897                          February 7, 1961

Clyde S. Scanley et al.

It is hereby certified that error appears in the above numbered patent requiring correction and that the said Letters Patent should read as corrected below.

Column 1, lines 38 to 41, and column 2, lines 61 to 64, the formula, each occurrence, should appear as shown below instead of as in the patent:

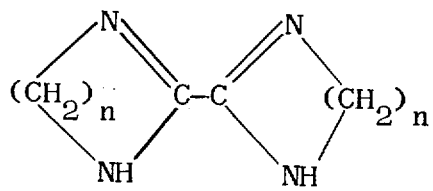

column 2, lines 3 to 7, and column 3, lines 5 to 8, the formula, each occurrence, should appear as shown below instead of as in the patent:

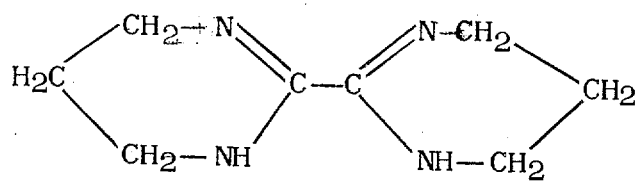

Signed and sealed this 3rd day of April 1962.

(SEAL)
Attest:

ERNEST W. SWIDER                          DAVID L. LADD
Attesting Officer                         Commissioner of Patents